United States Patent
Nakanishi et al.

(10) Patent No.: US 10,341,513 B2
(45) Date of Patent: Jul. 2, 2019

(54) ELECTRONIC APPARATUS AND IMAGE FORMING APPARATUS

(71) Applicant: KYOCERA Document Solutions Inc., Osaka (JP)

(72) Inventors: Shinichi Nakanishi, Osaka (JP); Michiko Tashiro, Osaka (JP); Emi Tennichi, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 53 days.

(21) Appl. No.: 15/589,227

(22) Filed: May 8, 2017

(65) Prior Publication Data

US 2017/0331966 A1    Nov. 16, 2017

(30) Foreign Application Priority Data

May 12, 2016   (JP) ................................. 2016-096323

(51) Int. Cl.
*H04N 1/00* (2006.01)
*H04N 1/32* (2006.01)

(52) U.S. Cl.
CPC ..... *H04N 1/00506* (2013.01); *H04N 1/00411* (2013.01); *H04N 1/00424* (2013.01); *H04N 1/00435* (2013.01); *H04N 1/00477* (2013.01); *H04N 1/32657* (2013.01); *H04N 2201/0089* (2013.01); *H04N 2201/0094* (2013.01); *H04N 2201/3276* (2013.01)

(58) Field of Classification Search
CPC ................................................ H04N 1/00506
See application file for complete search history.

(56) References Cited

U.S. PATENT DOCUMENTS

| | | | |
|---|---|---|---|
| 8,010,009 B2 | 8/2011 | Mochizuki et al. | |
| 8,204,398 B2 | 6/2012 | Mochizuki et al. | |
| 2007/0201050 A1 | 8/2007 | Mochizuki et al. | |
| 2011/0074707 A1* | 3/2011 | Watanabe | G06F 3/03547 345/173 |
| 2011/0261411 A1 | 10/2011 | Mochizuki et al. | |
| 2013/0307794 A1* | 11/2013 | Nagumo | G06F 3/041 345/173 |

FOREIGN PATENT DOCUMENTS

| | | |
|---|---|---|
| JP | H10-107940 A | 4/1998 |
| JP | 2007-226057 A | 9/2007 |
| JP | 2008-037040 A | 2/2008 |

OTHER PUBLICATIONS

Notice of Reasons for Refusal dated Oct. 9, 2018 mailed in the corresponding Japanese Patent Application No. 2016-096323.

* cited by examiner

*Primary Examiner* — King Y Poon
*Assistant Examiner* — Michael Burleson
(74) *Attorney, Agent, or Firm* — IP Business Solutions, LLC

(57) ABSTRACT

An electronic apparatus includes an operation unit and a control unit. The control unit performs a guidance image display control, a step bar display control, and a step bar operation detection control. When the touch operation on a given position of the step bar is detected in the step bar operation detection control, the control unit causes the display unit to display the plurality of guidance images corresponding to the process associated with the position where the touch operation has been made, in the guidance image display control.

5 Claims, 11 Drawing Sheets

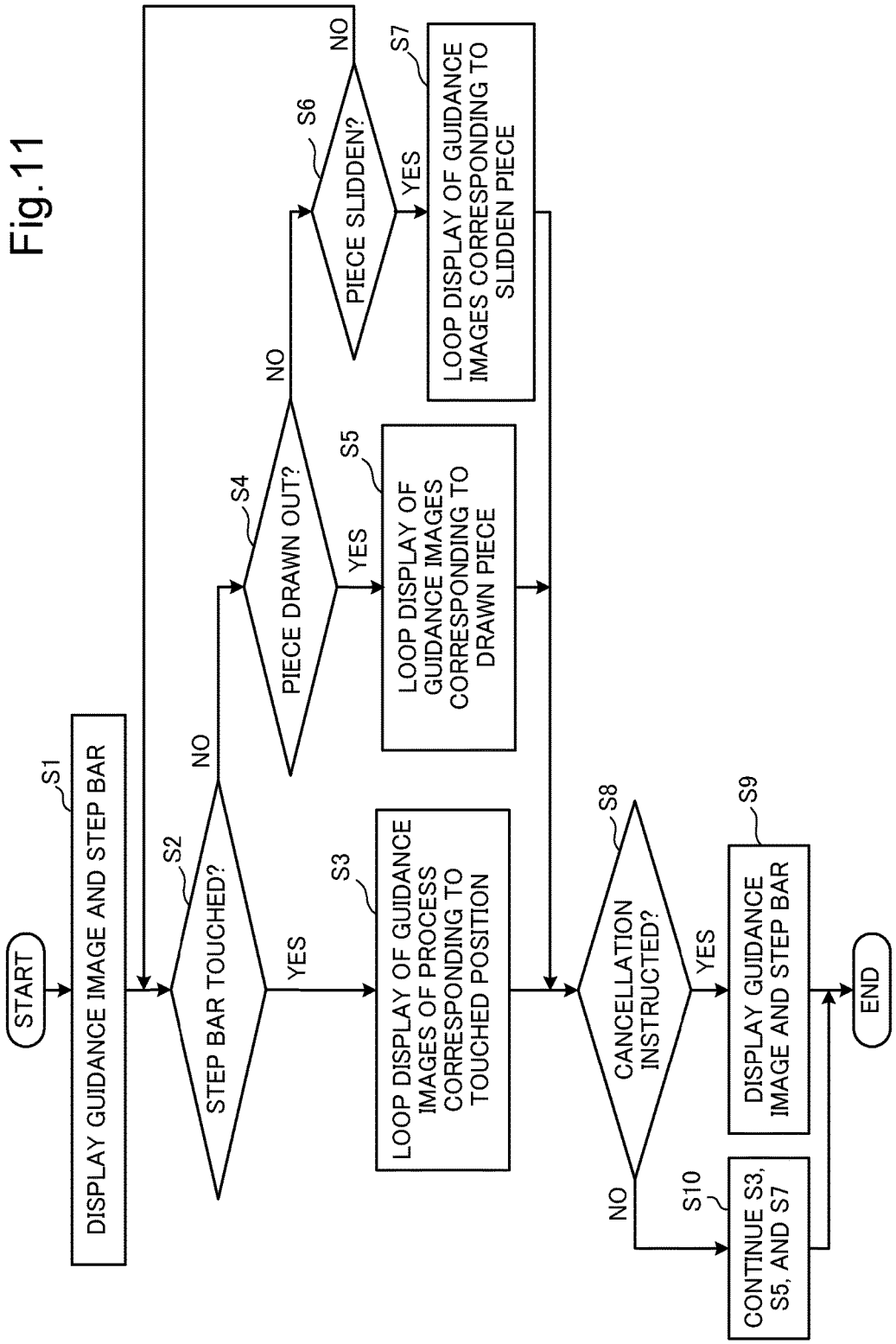

# ELECTRONIC APPARATUS AND IMAGE FORMING APPARATUS

INCORPORATION BY REFERENCE

This application claims priority to Japanese Patent Application No. 2016-096323 filed on May 12, 2016, the entire disclosure of which are incorporated herein by reference.

BACKGROUND

The present disclosure relates to an electronic apparatus and an image forming apparatus, and in particular to a technique to improve operability in displaying a guidance image representing an operation procedure.

Many of image forming apparatuses such as a printer and a multifunction peripheral include a display device for presenting various operation guides to users. In such image forming apparatuses with the display device, for example when paper jam occurs during an image forming operation, a guidance image describing the remedy is displayed on the display device. Some of the image forming apparatuses are configured to display a guidance image desired by the user, when the user presses a frame advance key or a frame return key on the guidance image displayed on the display device. In addition, there are image forming apparatuses configured to skip the guidance images representing processes already finished, in the fixing process of the paper jam.

SUMMARY

The disclosure proposes further improvement of the foregoing technique.

In an aspect, the disclosure provides an electronic apparatus including an operation unit and a control unit. The operation unit includes a display unit having a touch panel. The control unit includes a processor, and performs, when the processor operates according to an operation program, (i) a guidance image display control including causing the display unit to display a plurality of guidance images representing an operation procedure in an order of steps, (ii) a step bar display control including causing the display unit to display a step bar schematically representing an entirety of processes of the operation procedure, when the guidance images are displayed, and (iii) a step bar operation detection control including detecting a touch operation made on the step bar displayed on the display unit. When the touch operation on a given position of the step bar is detected in the step bar operation detection control, the control unit causes the display unit to display the plurality of guidance images corresponding to the process associated with the position where the touch operation has been made, in the guidance image display control.

In another aspect, the disclosure provides an image forming apparatus including the foregoing electronic apparatus, and an image forming unit that forms an image on a recording sheet.

BRIEF DESCRIPTION OF THE DRAWINGS

FIG. 11 is a flowchart showing a guidance display operation of the image forming apparatus performed in the event of the paper jam.

DETAILED DESCRIPTION

Figure 1:
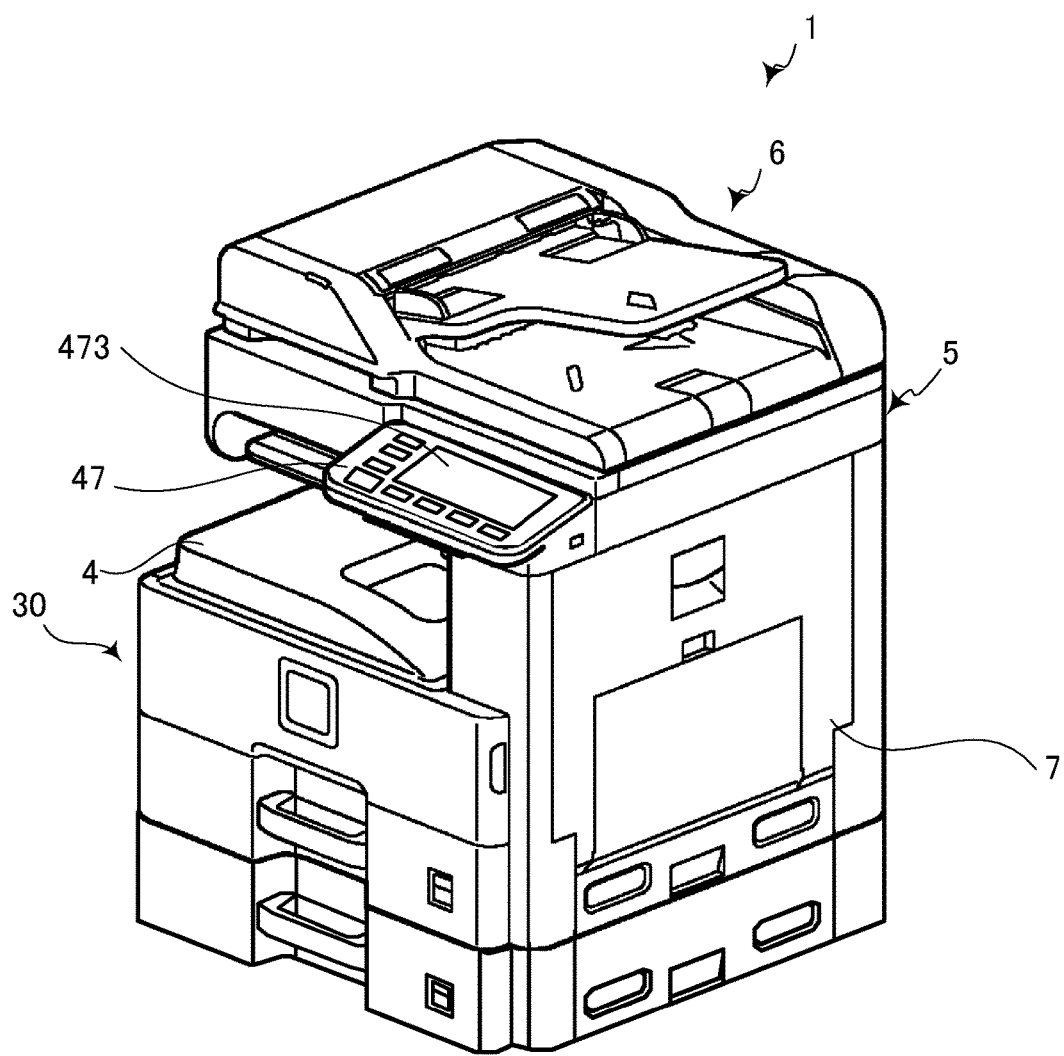
FIG. 1 is a perspective view showing an appearance of an image forming apparatus according to an embodiment of the disclosure.

Hereafter, an electronic apparatus and an image forming apparatus according to an embodiment of the disclosure will be described with reference to the drawings. FIG. 1 is a perspective view showing an appearance of the image forming apparatus according to the embodiment of the disclosure.

The image forming apparatus 1, exemplifying the electronic apparatus according to the embodiment of the disclosure, is a multifunction peripheral configured to execute a plurality of functions including, for example, a facsimile function, a copying function, a printing function, and a scanning function.

A plurality of components for realizing various functions of the image forming apparatus 1 are provided inside a casing 7 constituting the outer shell of the image forming apparatus 1. For example, the casing 7 include an image reading unit 5, an image forming unit 12 (see FIG. 2), a fixing unit 13 (see FIG. 2), a paper feeding unit 30, and so forth.

The image reading unit 5 is an automatic document feeder (ADF) including a document feeding unit 6 and a scanner that optically reads a source document transported by the document feeding unit 6 or placed on a non-illustrated contact glass. The image reading unit 5 reads one by one the source documents to be copied or transmitted by facsimile, to thereby acquire image data to be formed into an image.

The image forming unit 12 includes a photoconductor drum, a charging device, an exposure device, a developing device, and a transfer device, and forms (prints) the image on a recording sheet supplied from the paper feeding unit 30, on the basis of the image read by the image reading unit 5 or print data transmitted from a personal computer connected to a network or from another facsimile machine. The recording sheet on which the image has been printed undergoes a fixing process in the fixing unit 13, and is discharged to an output tray 4.

The operation unit 47 is used by a user to input an operation instruction, as well as characters or numerals, to the image forming apparatus 1. The operation unit 47 includes a display unit 473 of a touch panel type, for displaying an operation guide screen and setting screens of functions for the user. The display unit 473 detects, through the touch panel function, a touch operation made by the user on an icon or a button displayed on the display unit 473 touch panel, to thereby receive the setting of detailed items of the functions to be performed by the image forming apparatus 1, and the execution instruction of the function, according to the content corresponding to the touch operation detected.

Figure 2:
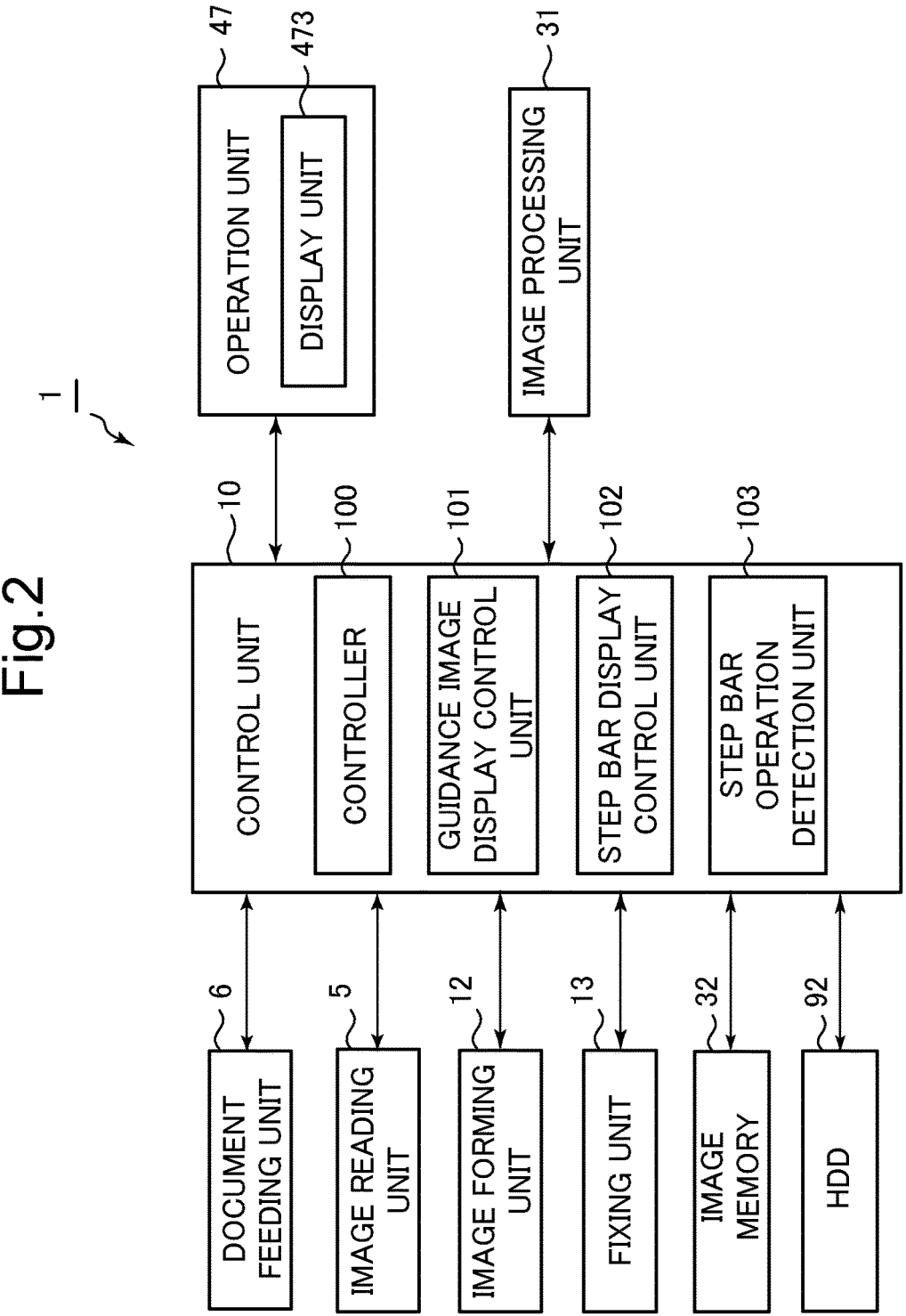
FIG. 2 is a functional block diagram showing an internal configuration of the image forming apparatus.

An internal configuration of the image forming apparatus 1 will be described hereunder. FIG. 2 is a functional block diagram showing the internal configuration of the image forming apparatus.

The image forming apparatus 1 includes a control unit 10. The control unit 10 includes a processor, a random-access memory (RAM), a read-only memory (ROM), and so forth. The processor is, for example, a central processing unit (CPU), a microprocessor unit (MPU), an application specific integrated circuit (ASIC), or the like.

The image reading unit 5 illuminates the source document with a light emitting device, and receives the reflected light with a CCD sensor thereby reading the image of the source document.

The image processing unit 31 processes the source document image read by the image reading unit 5, as may be necessary.

The image memory 32 is a region for temporarily storing the source document image acquired by the image reading unit 5, in other words the image data to be formed into an image by the image forming unit 12.

The image forming unit 12 forms an image, for example from the source document image read by the image reading unit 5.

The fixing unit 13 heats the recording sheet on which the image (toner image) has been formed through the image forming operation of the image forming unit 12, to thereby fix the image on the recording sheet by thermal compression bonding.

The operation unit 47 is used to input user's instructions with respect to operations and processes that the image forming apparatus 1 is configured to perform. The operation unit 47 includes a touch panel type display unit 473 for displaying operation guides for the user.

A hard disk drive (HDD) 92 is a large-capacity storage device for storing, for example, the source document image read by the image reading unit 5.

The control unit 10 includes a controller 100, a guidance image display control unit 101, a step bar display control unit 102, and a step bar operation detection unit 103.

The control unit 10 acts as the controller 100, the guidance image display control unit 101, the step bar display control unit 102, and the step bar operation detection unit 103, for example when the processor executes a control program stored in the HDD 92. Here, the components of the control unit 10 may each be constituted in the form of a hardware circuit, instead of being performed according to the program.

The controller 100 is connected to the image reading unit 5, the document feeding unit 6, the image processing unit 31, the image memory 32, the image forming unit 12, the fixing unit 13, the operation unit 47, the display unit 473, and the HDD92, and controls the operation of these functional units.

The guidance image display control unit 101 displays, when paper jam occurs during the image forming operation of the image forming apparatus 1, a guidance image representing a remedy for fixing the paper jam, in a predetermined position in the display region of the display unit 473. A plurality of guidance images are stored in the ROM of the control unit 10, and the guidance image display control unit 101 sequentially reads out the guidance images from the ROM, and displays those guidance images at predetermined time intervals, on the display unit 473. Here, the remedy for fixing the paper jam exemplifies the operation procedure in the disclosure.

Figure 3:
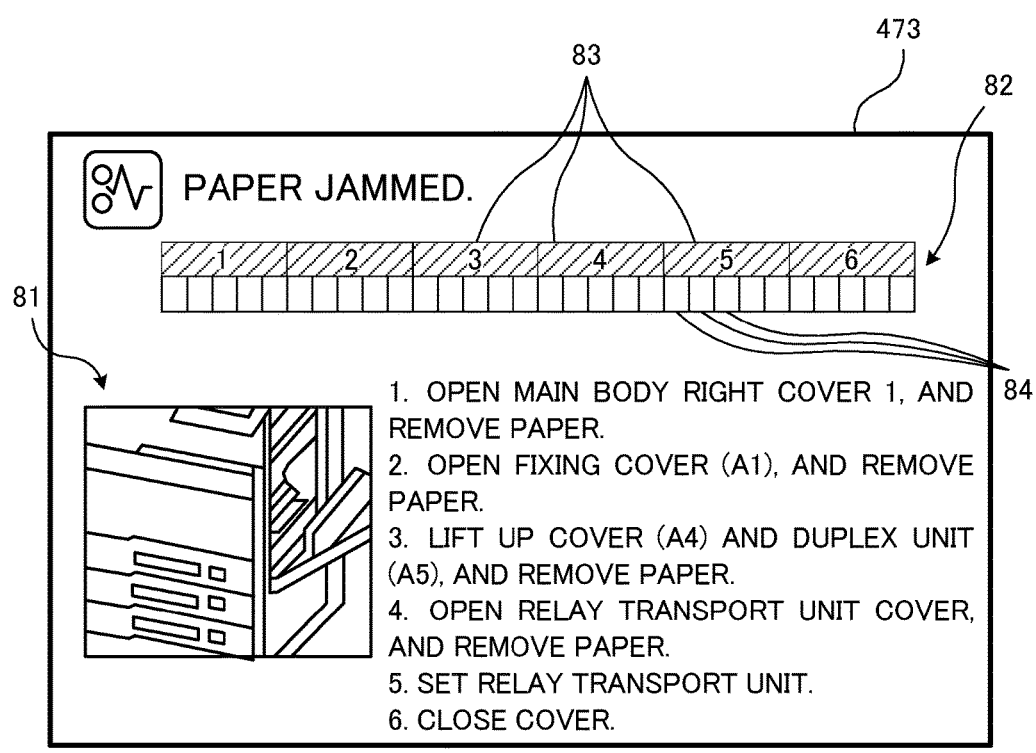
FIG. 3 is a schematic drawing showing an example of a display that appears on a display unit in the event of paper jam.

FIG. 3 is a schematic drawing showing an example of the display of the remedy that appears on the display unit 473 in the event of the paper jam. For example, the guidance image display control unit 101 displays a series of steps (process) for fixing the paper jam in characters, in a part of the display region of the display unit 473. The guidance image display control unit 101 displays a guidance image 81 beside the region where the series of steps is displayed. In the example shown in FIG. 3, the remedy for fixing the paper jam displayed by the guidance image display control unit 101 on the display unit 473 includes a first to a sixth processes. The guidance image display control unit 101 displays images respectively corresponding to the six processes, from the first to the sixth, by turns in the region of the guidance image 81. Such an arrangement allows the user to visually confirm the region to look into and the action to take.

Referring back to FIG. 2, the step bar display control unit 102 displays, when the guidance image is displayed on the display unit 473 by the guidance image display control unit 101, a step bar representing the outline of the overall process of the remedy for fixing the paper jam, in a predetermined position in the display region of the display unit 473.

For example, as illustrated in FIG. 3, a step bar 82 is displayed in an upper portion of the display region of the display unit 473. The step bar 82 includes bar images each representing a part of the overall process of the remedy for fixing the paper jam. In the example shown in FIG. 3, the step bar 82 includes a first to a sixth numeric objects 83 corresponding to the respective processes, assigned side by side.

In addition, a plurality of piece images 84 are aligned under each of the numeric objects 83, in the direction in which the numeric objects 83 are aligned and parallel thereto. The plurality of piece images 84 correspond to the guidance images 81, on a one-to-one basis. In other words, the same number of guidance images 81 as the number of piece images 84 located under the numeric objects 83 are prepared. The step bar 82 includes the piece images 84 corresponding to the guidance images 81 on a one-to-one basis, aligned under each of the six processes.

In the example shown in FIG. 3, the first to the sixth processes each include five guidance images 81. However, the number of guidance images 81 may differ in each of the processes. In this case, the numeric object 83 representing a process including a larger number of guidance images 81 is displayed over a wider range, and the numeric object 83 representing a process including a fewer number of guidance images 81 is displayed over a narrower range.

Back again to FIG. 2, the step bar operation detection unit 103 detects a touch operation made on the step bar 82 displayed on the display unit 473. More specifically, the step bar operation detection unit 103 detects a touch made by the user on a given position of the step bar 82, on the basis of an output from the touch panel function.

Figure 4:
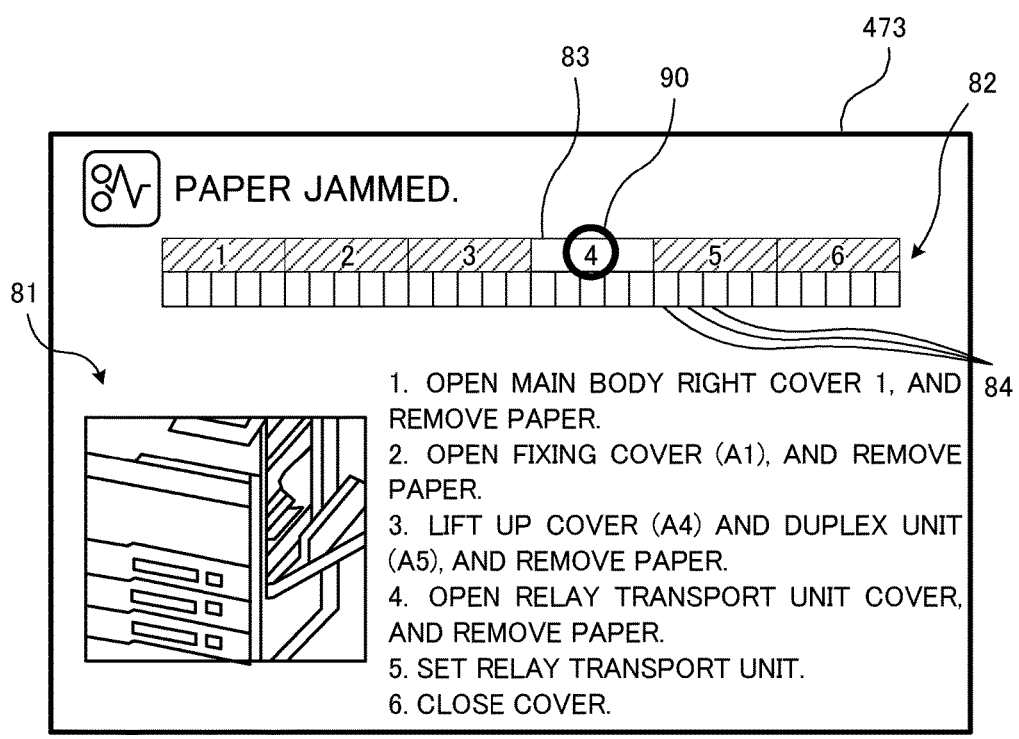
FIG. 4 is a schematic drawing showing an example of a display that appears on the display unit when a step bar is touched.

FIG. 4 is a schematic drawing showing an example the display that appears on the display unit 473 when the step bar 82 is touched. When the user touches, for example, the numeric object 83 representing the fourth process (numeric object 83 with the numeral 4) on the step bar 82 (touch position 90), while the guidance image representing the remedy for fixing the paper jam is displayed on the display unit 473 by the guidance image display control unit 101, the step bar operation detection unit 103 detects the touch operation thus made and the position in the display region of the display unit 473 where the touch operation has been made. When the step bar operation detection unit 103 detects the touch operation, the step bar display control unit 102 expressly indicates that the numeric object 83 has been touched, for example by reversing the contrast of the numeric object 83 that has been touched. Further, when the step bar operation detection unit 103 thus detects the touch operation, the guidance image display control unit 101 sequentially switches the plurality of guidance images 81 representing the process corresponding to the touched position of the step bar 82, thereby performing a loop display of the guidance images 81 on the display unit 473.

Figure 5:
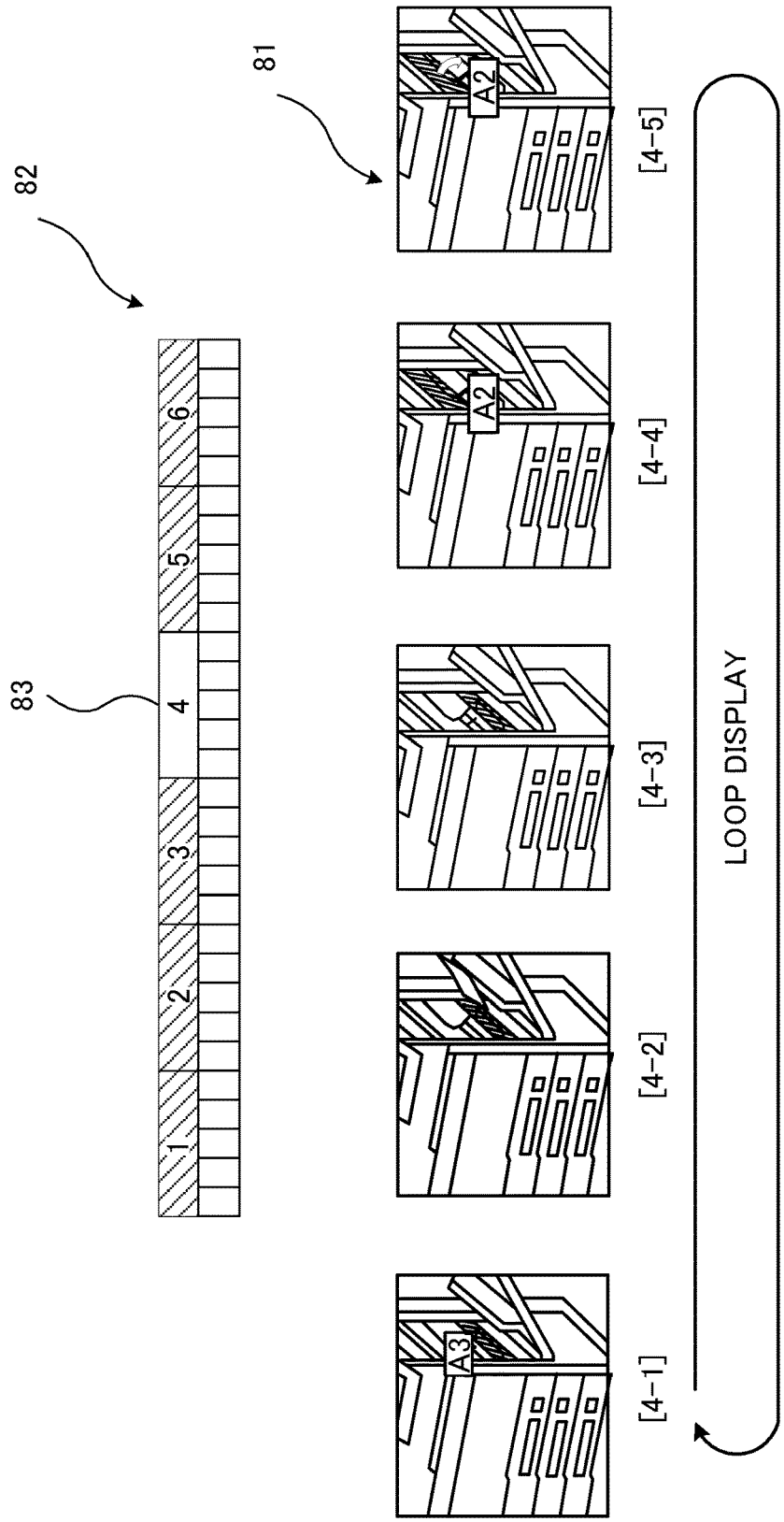
FIG. 5 is a schematic drawing for explaining a loop display of guidance images in a process.

FIG. 5 is a schematic drawing for explaining the loop display of the guidance images in a given process. For example, when the user touches the numeric object 83 representing the fourth process on the step bar 82, and the step bar operation detection unit 103 detects the touch operation thus made and the position where the touch operation has been made, in other words when the instruction to select the fourth process is detected, the guidance image display control unit 101 suspends the current display, even though a different guidance image 81 has thus far been displayed, and starts to sequentially display the guidance images 81 representing the fourth process selected, from the first one of the guidance images 81, on the display unit 473. For example, in the case where the fourth process includes five guidance images 81, namely images [4-1], [4-2], [4-3], [4-4], and [4-5], the guidance image display control unit 101 sequentially switches [4-1] to [4-5] of the guidance images 81, to thereby display the guidance images 81 from [4-1] to [4-5] one by one in a loop, as long as the numeric object 83 representing the fourth process is selected on the step bar 82.

As described above, when the paper jam occurs the step bar 82 representing the outline of the overall process of the remedy is displayed on the display unit 473, and when the user touches the desired numeric object 83 in the step bar 82, the guidance image 81 representing the process corresponding to the numeric object 83 that has been touched is displayed. Accordingly, when the user has missed a certain guidance image 81 of the process, or wishes to see the following process, the user can view the display of the guidance image 81 of the desired process, by touching the numeric object 83 corresponding to the desired process. Thus, improved operability can be provided in viewing the guidance images 81 of the operation procedure representing the remedy for fixing the paper jam.

Further, the step bar operation detection unit 103 detects a drawing operation performed by the user with respect to a selected one of the piece images 84 in the step bar 82. The drawing operation refers to an action of touching the piece image 84, and sliding the finger in a predetermined direction keeping the finger in contact with the display screen of the display unit 473, thereby causing the piece image 84 to slide. The predetermined direction refers to a direction orthogonal to the direction in which the step bar 82 and the piece images 84 located thereunder are aligned in the display unit 473, and corresponds to a downward direction in FIG. 4, for example. In addition, the step bar operation detection unit 103 also detects the travel distance in the predetermined direction (travel distance of the sliding action) realized by the drawing operation.

The step bar display control unit 102 causes the display unit 473 to display an image in which the piece images 84 of a number corresponding to the travel distance detected by the step bar operation detection unit 103 appear to have been drawn out from the step bar 82 in the predetermined direction.

Figure 6:
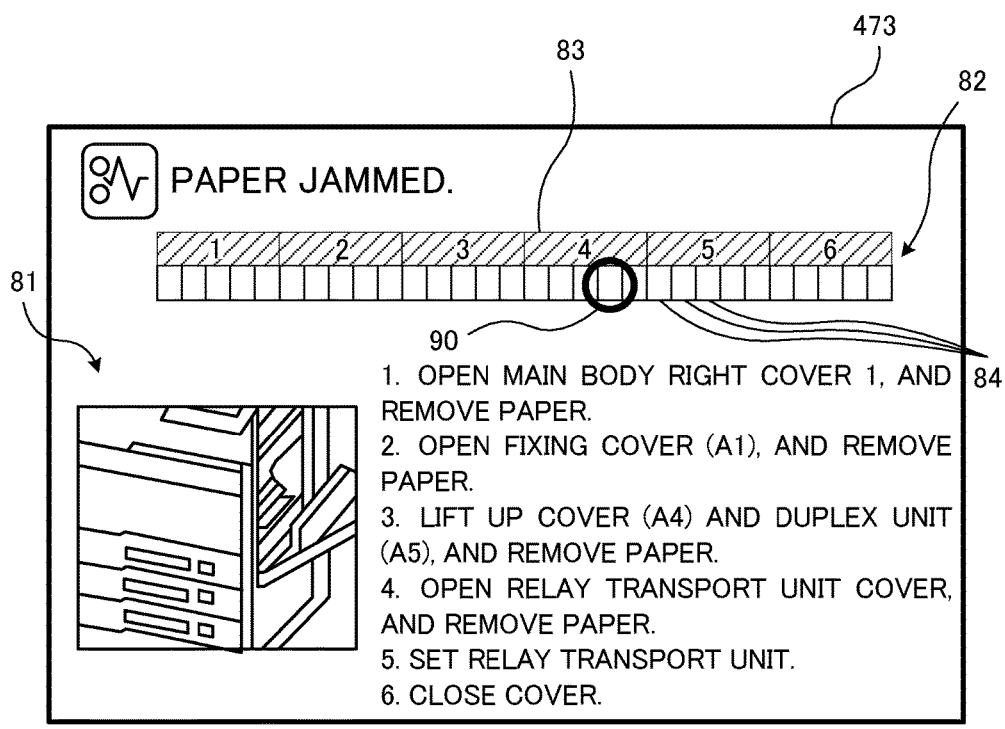
FIG. 6 is a schematic drawing showing an example of a display that appears on the display unit when a piece image in the step bar is touched.
Figure 7:
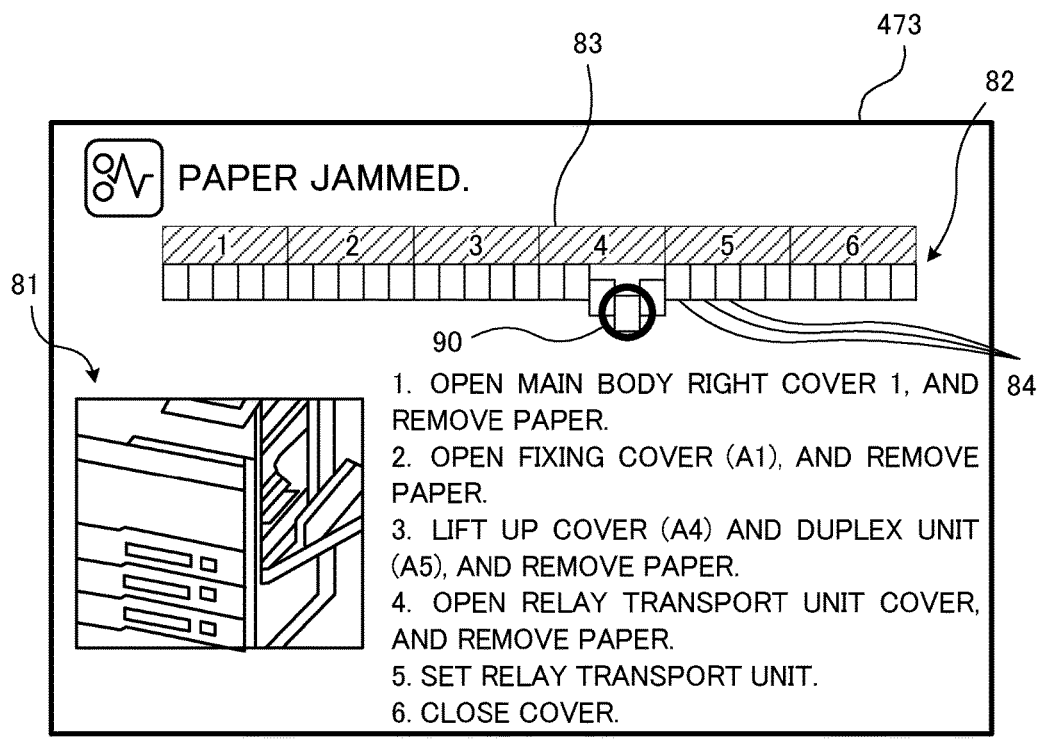
FIG. 7 is a schematic drawing showing an example of a display that appears on the display unit when the piece images are drawn out from the step bar.

FIG. 6 is a schematic drawing showing an example of the display that appears on the display unit 473 when the piece image 84 in the step bar 82 is touched. FIG. 7 is a schematic drawing showing an example of the display that appears on the display unit 473 when the piece images 84 are drawn out from the step bar 82.

For example, when the user slides the finger downward from a touch position 90 indicated in FIG. 6, the step bar operation detection unit 103 detects the sliding action as the drawing operation. The step bar display control unit 102 then displays, as shown in FIG. 7, an image in which the piece image 84 at the touch position 90 and the adjacent piece images 84 on both sides.

Further, the guidance image display control unit 101 sequentially switches the guidance images 81 corresponding to the piece images 84 drawn out from the step bar 82, thereby performing the loop display on the display unit 473.

Figure 8:
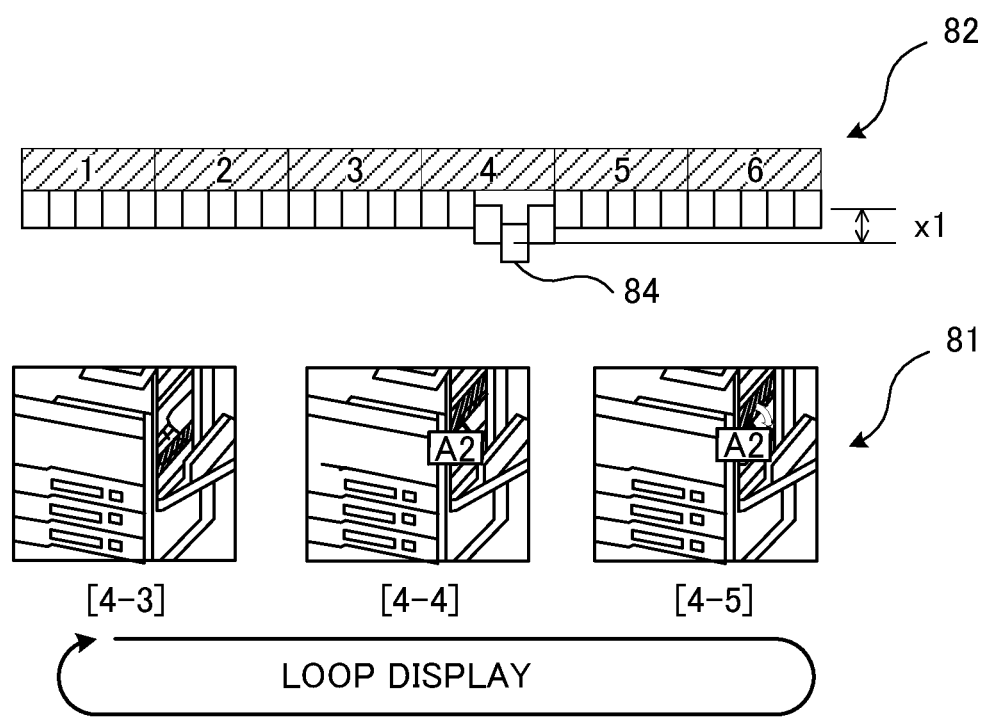
FIG. 8 is a schematic drawing for explaining the loop display of the guidance images that appears when the step bar is set to the state shown in FIG. 7.

FIG. 8 is a schematic drawing for explaining the loop display of the guidance images 81 that appears when the step bar 82 is set to the state shown in FIG. 7. FIG. 8 illustrates the case where the step bar operation detection unit 103 has detected the travel distance x1 in the predetermined direction, and the step bar display control unit 102 has decided that the number of guidance images 81 corresponding to the travel distance x1 is three. In this case, the step bar display control unit 102 displays the image in which three piece images 84, namely the fourth piece images 84 of the fourth process and the adjacent piece images 84 on both sides (i.e., third and fifth) are drawn out from the step bar 82. Accordingly, the guidance image display control unit 101 sequentially switches the third to the fifth guidance images 81 of the fourth process ([4-3] to [4-5]), thus displaying the guidance images 81 one by one, in a loop.

Figure 9:
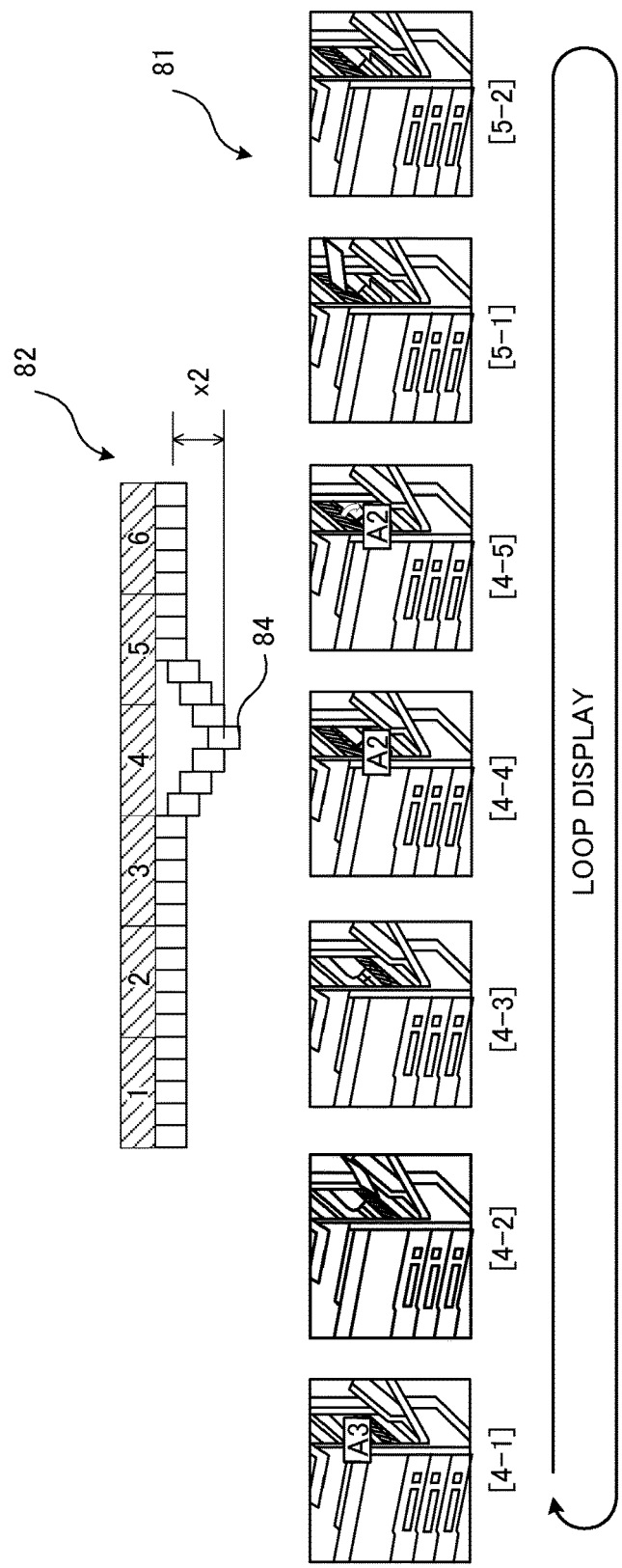
FIG. 9 is a schematic drawing for explaining the loop display of the guidance images that appears when more piece images are drawn out from the state shown in FIG. 7.

FIG. 9 is a schematic drawing for explaining the loop display of the guidance images 81 that appears when more piece images 84 are drawn out from the state shown in FIG. 7. When the user slides the finger further downward, in other words increases the drawing stroke from the state shown in FIG. 7, the step bar operation detection unit 103 detects the increased travel distance x2, and the step bar display control unit 102 decides the number of piece images 84 corresponding to the travel distance x2. In this case, the step bar display control unit 102 decides the number of piece images 84 in proportion to the length of the travel distance. Since the travel distance x2 is longer than the travel distance x1 in this example, the step bar display control unit 102 decides a larger number of piece images 84 on the basis of the travel distance x2, compared with the case of the travel distance x1.

FIG. 9 illustrates the example in which the step bar display control unit 102 has decided that the number of piece images 84 corresponding to the travel distance x2 is seven. For example when the step bar operation detection unit 103 detects that the fourth piece images 84 of the fourth process has been touched, the step bar display control unit 102 causes the display unit 473 to display the image in which seven piece images 84, namely the fourth piece images 84 of the fourth process and the adjacent three piece images 84 on both sides, are drawn out from the step bar 82.

Accordingly, the guidance image display control unit 101 sequentially switches the seven guidance images 81 respectively corresponding to the seven piece images 84, thus displaying the guidance images 81 one by one, in a loop. More specifically, as long as the seven piece images 84 are drawn out from the step bar 82, the guidance image display control unit 101 repeatedly displays the seven guidance images 81, namely from the first guidance image of the fourth process to the second guidance image of the fifth process ([4-1] to [5-2]). Thus, the guidance images 81 can be sequentially switched over a plurality of processes, and displayed one by one in a loop.

As described above, the user can view the desired number of guidance images 81 of the desired position out of the plurality of guidance images 81 sequentially displayed in each process, by performing the action of drawing out the piece images 84 from the step bar 82. Thus, improved operability can be provided in viewing the guidance images 81 of the operation procedure representing the remedy for fixing the paper jam.

When the user draws out a desired piece image 84 from the step bar 82 and then slides the finger in the direction parallel to the step bar 82, the step bar operation detection unit 103 detects such sliding operation. When the step bar operation detection unit 103 detects the sliding operation, the step bar display control unit 102 displays the step bar 82 in which the piece images 84 to be drawn out from the step bar 82 have been changed in accordance with the sliding operation.

Figure 10:
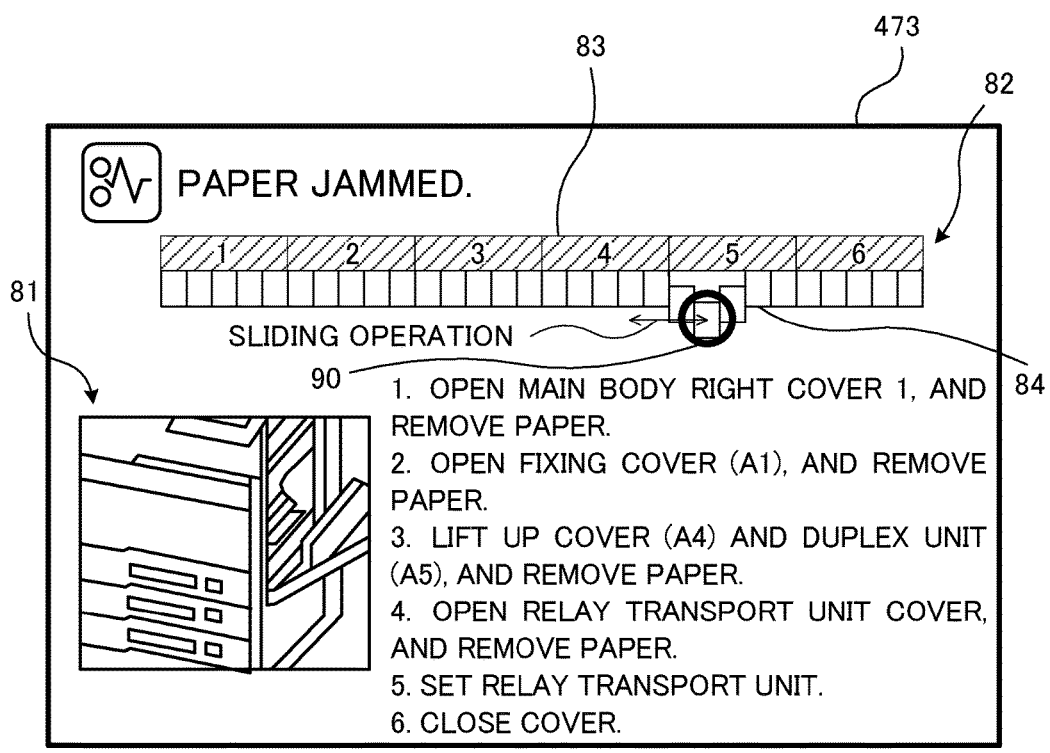
FIG. 10 is a schematic drawing showing an example of a display that appears on the display unit when a sliding operation is performed in the state shown in FIG. 7.

FIG. 10 is a schematic drawing showing an example of a display that appears on the display unit 473 when the sliding operation is performed in the state shown in FIG. 7. For example, when the user slides the finger to the right from the state shown in FIG. 7, the step bar operation detection unit 103 detects the sliding operation. At this point, the step bar display control unit 102 causes the display unit 473 to display an image in which the piece image 84 located at the terminal position of the sliding operation in the predetermined direction (in FIG. 10, second piece image 84 of the fifth process), and the adjacent piece images 84 on both sides, of the number corresponding to the travel distance x1, appear to have been drawn out from the step bar 82. Then the guidance image display control unit 101 sequentially switches the guidance images 81 respectively corresponding to the piece images 84 newly drawn out as shown in FIG. 10, to display the guidance images 81 one by one in a loop. More specifically, in the state shown in FIG. 7 the third to the fifth guidance images 81 of the fourth process are displayed in a loop, however when the user performs the sliding operation such that the step bar display control unit 102 causes the display unit 473 to display the image in which, as shown in FIG. 10, the first to the third piece images 84 of the fifth process appear to have been drawn out from the step bar 82, the guidance image display control unit 101 sequentially switches the guidance images 81 respectively corresponding to the three piece images 84, in other words the first to the third guidance images 81 of the fifth process, thus displaying these guidance images 81 one by one in a loop.

Hereunder, paper jam the guidance display operation performed by the image forming apparatus 1 in the event of paper jam will be described. FIG. 11 is a flowchart showing the guidance display operation of the image forming apparatus performed in the event of the paper jam.

When paper jam occurs during the image forming operation of the image forming apparatus 1, the controller 100 temporarily suspends the image forming operation and causes the display unit 473 to display the caution screen as shown in FIG. 3. At this point, the guidance image display control unit 101 causes the display unit 473 to sequentially display the guidance images 81 from the first process of the remedy for fixing the paper jam, and the step bar display control unit 102 causes the display unit 473 to display the step bar 82 (S1).

When the user touches a desired numeric object 83 in the step bar 82 while the guidance images 81 are sequentially displayed by the guidance image display control unit 101 on the display unit 473, the step bar operation detection unit 103 detects the touch operation (YES at S2), and the step bar display control unit 102 displays the step bar 82 with a change in appearance of the numeric object 83 that has been touched. Further, the guidance image display control unit 101 jumps to the first guidance image 81 of the process corresponding to the numeric object 83 that has been touched, and performs the loop display of the guidance images 81 of the process from the first one, on the display unit 473 (S3).

When the user performs the drawing operation to draw out the desired piece image 84 from the step bar 82, the step bar operation detection unit 103 detects such drawing operation (NO at S2, YES at S4), the step bar display control unit 102 shifts the display of the step bar 82 to the image in which the selected piece images 84 appear to have been drawn out from the step bar 82. Further, the guidance image display control unit 101 sequentially switches the guidance images 81 respectively corresponding to the piece images 84 drawn out from the step bar 82, thus displaying the guidance images 81 one by one in a loop (S5).

When the user further performs the sliding operation after performing the drawing operation, the step bar operation detection unit 103 detects the sliding operation (NO at S4, YES at S6), the step bar display control unit 102 causes the display unit 473 to display the image in which the piece image 84 located at the terminal position of the sliding operation in the predetermined direction and the adjacent piece images 84 on both sides appear to have been drawn out from the step bar 82. Then the guidance image display control unit 101 sequentially switches the guidance images 81 respectively corresponding to the piece images 84 newly drawn out from the step bar 82, thus displaying the guidance images 81 one by one in a loop (S7).

While the guidance images 81 are displayed in a loop at S3, S5, or S7, the controller 100 decides whether the loop display is to be cancelled. For example, when the user touches another position on the display unit 473 than the step bar 82, the operation unit 47 detects, through the touch panel function, such touch operation as a cancellation instruction to stop the loop display of the guidance images 81 (YES at S8). At this point, the guidance image display control unit 101 suspends the loop display of the guidance images 81, and resumes the display of the remedy and the guidance images 81 of S1 (S9).

In the case where the cancellation instruction of the user is not detected (NO at S8), the operation of one of steps S3, S5, and S7 that has thus far been performed is continued.

It will be assumed here that an image forming apparatus is configured to display a guidance image desired by the user, when the user presses a frame advance key or a frame return key with respect to the guidance images displayed on a display device. With such an image forming apparatus, although the guidance image desired by the user can be displayed by pressing the frame advance key or frame return key, the user is unable to jump to a guidance image of another part of the overall process of the remedy for fixing the paper jam. In addition, the user has to remain aware of to which process the currently displayed guidance image corresponds, when selecting the desired guidance image, which constitutes a burden on the user in the operation.

Further, in an image forming apparatus configured to skip the guidance image representing the process already finished in the fixing of the paper jam, the paper jam sensor no longer detects the paper jam with respect to the location where the paper jam has been fixed, and the corresponding guidance image is no longer displayed. In other words, the guidance image of the process remains displayed until the paper jam is fixed. Such type of image forming apparatus is designed on the premise that the user correctly performs the remedy in the specified sequence when paper jam occurs, and therefore the remedy for fixing the paper jam is displayed from the beginning of the overall process when paper jam occurs, and the user is unable to jump to the guidance image of the desired process.

With the image forming apparatus 1 according to the embodiment, in contrast, the step bar 82 is displayed on the display unit 473 in addition to the guidance image 81 when paper jam occurs, and the user can operate the step bar 82 so as to view the guidance image 81 of the desired process in the remedy for fixing the paper jam, on the display unit 473. Thus, improved operability can be provided in viewing the guidance images 81 representing the remedy for fixing the paper jam.

The invention is not limited to the foregoing embodiment, but may be modified in various manners. For example, although the step bar display control unit 102 displays the step bar 82 in the horizontal direction in FIG. 3 according to the embodiment, the step bar display control unit 102 may display the step bar 82 in the vertical direction in FIG. 3.

Although the remedy for fixing the paper jam is displayed as operation procedure on the display unit 473 in the foregoing embodiment, the disclosure is not limited to such an arrangement. The guidance may be displayed when a different type of operation procedure is displayed on the display unit 473.

Further, although the electronic apparatus according to the disclosure is exemplified by the image forming apparatus in the foregoing embodiment, the electronic apparatus of the disclosure may be different apparatuses with a display unit having a touch panel function, for example a mobile apparatus, medical equipment, a ticket vending machine, and so forth.

The configurations and processing according to the foregoing embodiments, described above with reference to FIG. 1 to FIG. 11, are merely exemplary and in no way intended to limit the configurations and processing of the invention.

Various modifications and alterations of this disclosure will be apparent to those skilled in the art without departing from the scope and spirit of this disclosure, and it should be understood that this disclosure is not limited to the illustrative embodiments set forth herein.

What is claimed is:
1. An electronic apparatus comprising:
a touch panel and a display; and
a control unit including a processor, and being configured to function, when the processor operates according to an operation program, against the display so that the display is caused to
(i) switch and display, on a first region of the display, a plurality of guidance images representing an operation procedure in an order of steps of the operation procedure,
(ii) display a step bar on a second region of the display different from the first region, the step bar including a plurality of piece images corresponding to the plurality of guidance images on a one-to-one basis, the plurality of piece images being aligned in a first direction in the order of the steps, and
(iii) when detecting through the touch panel that one of the plurality of piece images is touched and further a drawing operation in which the one of the plurality of piece images is made to slide in a second direction orthogonal to the first direction, display, on the second region, the step bar in a manner such that one or more piece images of a number corresponding to a travel distance in the second direction at the drawing operation are to be drawn in the second direction from the step bar, the piece images at least including the one of the plurality of the piece images having been drawn out, and display, on the first region, the guidance images respectively corresponding to the piece images being displayed so as to be drawn out from the step bar.

2. The electronic apparatus according to claim 1, wherein when the travel distance becomes longer than a predetermined travel distance, the control unit designates the piece image on which the drawing operation has been performed, and the piece images adjacent thereto, as the piece images of a number corresponding to the travel distance.

3. The electronic apparatus according to claim 1, wherein the control unit changes, when detecting through the touch panel a sliding operation in which one of the plurality of piece images is moved in the first direction after the drawing operation, the piece images being displayed so as to be drawn out from the step bar according to the sliding operation, and causes the display to display the guidance images respectively corresponding to the changed piece images on the first region.

4. The electronic apparatus according to claim 2, wherein the control unit sequentially switches the plurality of guidance images corresponding to the piece images being displayed so as to be drawn out from the step bar, and causes the display to sequentially display the plurality of guidance images one by one repeatedly.

5. An image forming apparatus comprising:
the electronic apparatus according to claim 1; and
an image forming unit that forms an image on a recording sheet.

* * * * *